July 25, 1944.  W. F. GROENE  2,354,258
CRANKSHAFT CHUCK
Filed Aug. 4, 1941   2 Sheets-Sheet 1
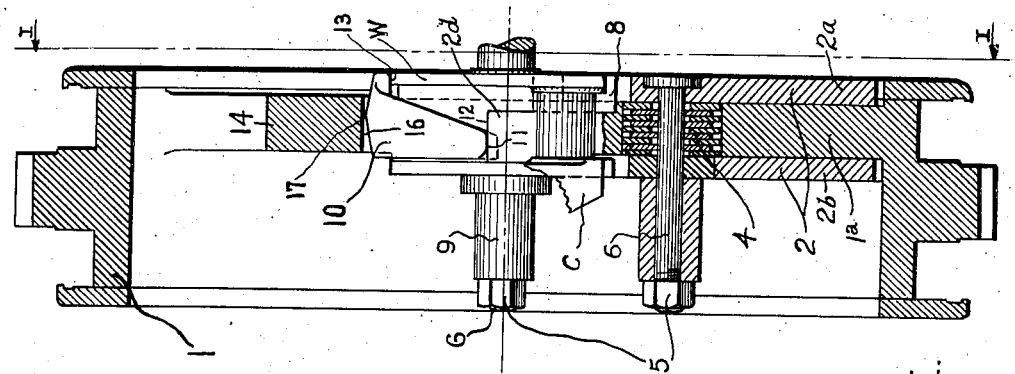
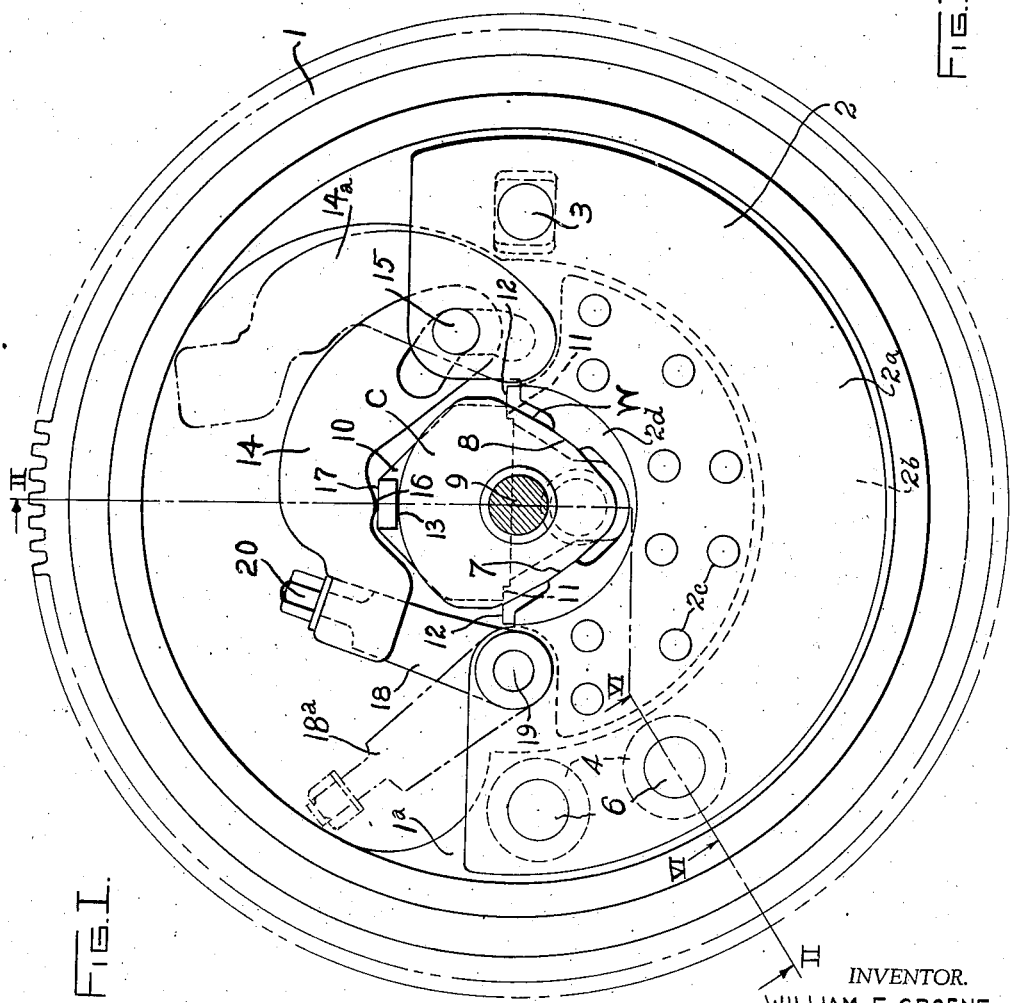
INVENTOR.
WILLIAM F. GROENE
BY
ATTY.

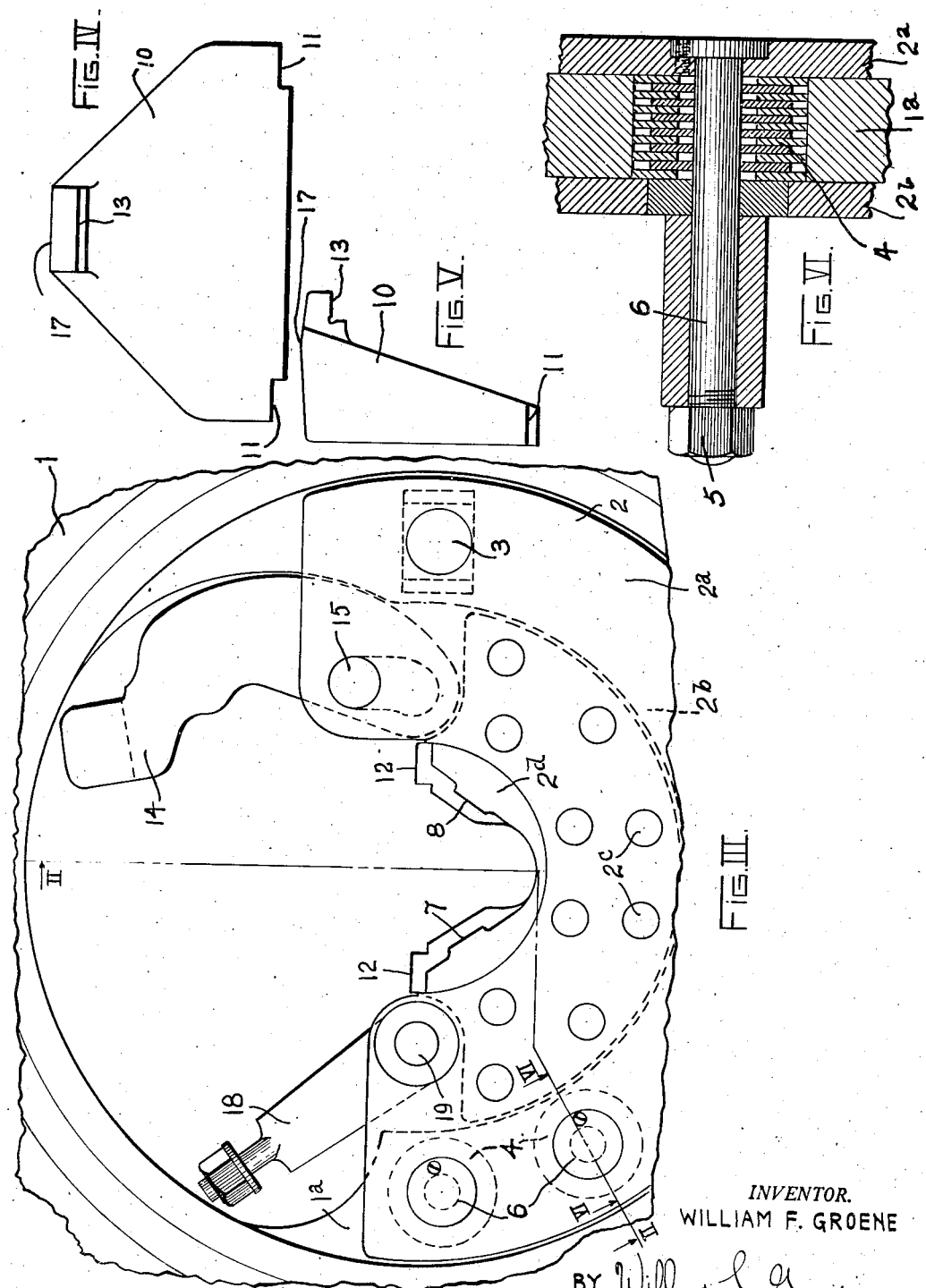

Patented July 25, 1944

2,354,258

UNITED STATES PATENT OFFICE 2,354,258

CRANKSHAFT CHUCK

William F. Groene, Cincinnati, Ohio, assignor to The R. K. Le Blond Machine Tool Company, Cincinnati, Ohio, a corporation of Delaware Application August 4, 1941, Serial No. 405,357

8 Claims. (Cl. 82—40)

This invention pertains to chucking or work holding devices for lathes, and is particularly directed to chucking devices for gripping crankshafts in center drive type of crankshaft lathes. It is particularly related to such type of chucking devices which are adapted to grip the crankshaft by means of its rough surfaces, usually on the webs of the shaft, while the shaft is held in prelocated position on the axis of rotation of the lathe as generally effected by means of the tailstock centering devices engaging the end portions of the crankshafts.

One of the chief objects of the invention is to provide improvements in the method of engaging the clamping members of such chucking devices on the rough webs of the crankshaft, so as to effect rigid and positive holding of the crankshaft, while at the same time providing sufficient facility to permit easy and rapid loading or unloading of the crankshafts in the chucking device.

A further object of this invention is to provide an arrangement in a chucking device for a crankshaft lathe in which the crankshaft is previously prelocated, having work engaging members, which engage the rough webs of the crankshaft, floatingly mounted on the work spindle of the lathe, and then to provide means for ultimately locking these work engaging members to the work spindle after these members have been fully and properly engaged on the crankshaft.

A further object of this invention is to provide in a center drive chucking device, adapted to engage the rough irregular webs of a crankshaft, work engaging members floatingly mounted on the center drive work spindle which engage a rough web of the crankshaft from one side of the axis of rotation in the lathe, and to provide a second work engaging means comprising a member engaging the web in opposed relation to the first mentioned work engaging members and which also engages a portion of the floating carrier device for said first mentioned work engaging members, and then to provide a single clamping means for holding all of the work engaging members firmly on the crankshaft web.

Another object of this invention is to provide in a center drive ring gear chuck, a floating work supporting member on the center drive ring gear having work engaging abutments to engage the rough periphery of a web of the crankshaft and to provide in conjunction with said work engaging abutments, a removable abutment block which engages the web in opposed relation to said first mentioned abutment and which also engages a portion of said floating member, and to provide means for locking all of said work engaging members securely together, and in addition to provide means for locking the floating member to the ring gear of the chucking device of the center drive ring gear after all of the work engaging abutments have been firmly engaged on the crankshaft web.

Further features and advantages of this invention will appear from the detailed description of the drawings in which:

Figure I is an axial view of the side of a typical center drive ring gear chucking device incorporating the features of this invention.

Figure II is a transverse diametral section on the line II—II of Figure I particularly showing the clamping block engaging the web and the floating abutment carrying member.

Figure III is an enlarged fragmentary view of a portion of the chuck shown in Figure I, particularly indicating the position of the clamping arm 14 and the eye bolt 18 when the crankshaft is removed from the chucking device and with the clamping block also removed from the chuck.

Figure IV is an enlarged face view of the clamping block which engages the crankshaft and floating member of the chuck.

Figure V is an end view of this clamping block shown in Figure IV.

Figure VI is an enlarged sectional view through the locking mechanism for binding the floating work carrier to the chuck body.

For illustrative purposes, this invention is shown applied to a work spindle comprising a center drive ring gear 1, upon which is floatingly mounted the work carrier member 2 comprising the side plates 2a and 2b riveted together by the rivets 2c to the segmental piece 2d which is arranged for radial sliding and pivotal swinging motion on the mounting stud 3, and which member 2 may be locked to the flange portion 1—a of the ring gear 1 by appropriate frictional locking means comprising the friction discs 4 which are clamped together by operating the nuts 5 of the clamping bolts 6, so as to clamp the member 2 securely to the ring gear 1—a when the work engaging abutments 7 and 8, fixed on the member 2, have properly engaged the web W of the crankshaft C, prelocated on the axis of rotation 9 of the lathe and ring gear 1 by any conventional means such as centering devices (not shown) engaging the ends of the crankshaft.

In order to securely bind the abutment surfaces 7 and 8 on the web W of the crankshaft C, a clamping block 10 is provided, which has abutment portions 11 which engage on surfaces 12 formed on the segmental piece 2d of the member 2 and also has a work engaging surface 13 which engages the web W of the crankshaft. A clamping arm 14 appropriately pivotally mounted on a pin 15 on the member 2 has a contact surface 16 which engages the surface 17 of the clamping block 10, so as to simultaneously force its surfaces 11 and 13 against the respective surfaces 12 and the web W of the crankshaft C as the eye bolt 18, carried on a pin 19 in the member 2, is tightened down by means of its nuts 20.

The operation of this chucking device is substantially as follows:

With the crankshaft appropriately prelocated on the axis rotation 9 of the lathe and ring gear 1 and with the clamping arm 14 and eye bolt 18 removed to the positions shown by the broken lines 14—a and 18—a and with the clamping block 10 removed from the chucking device, the crankshaft will then be positioned in the chucking device freely and not in contact with any of the work engaging members of the chuck, the member 2 will then be swung up to position to engage its work engaging abutments 7 and 8 on the crankshaft web W and the clamping block 10 is then placed in the chuck in engagement with the surfaces 12 and with its surface 13 engaging the web W of the crankshaft C. The arm 14 is then swung down and the eye bolt swung into clamping position and the nut 20 securely tightened down thus firmly gripping the web W against the surfaces 7 and 8 of the work carrying member 2 and the surface 13 of the clamping block 10. The nuts 5 on the clamping bolt 6 are then securely locked down so as to bind the member 2 on the ring gear in the position as determined by engagement of its work engaging members with the crankshaft web W. The chuck is then in condition for the machining operation to be undertaken on the crankshaft.

In removing the crankshaft from the chuck the reverse process is utilized, first the nuts 5 and the screws 6 are loosened to free the member 2 from the ring gear 1 preparatory to engaging another prelocated crankshaft by means of its rough web. The nut 20 of the eye bolt 18 is then loosened and the eye bolt and clamping arm 14 removed to the position 14—a and 18—a respectively, the clamping block 10 is then removed from the chucking device and web W, thereby permitting free access to the crankshaft for removing it and for replacing a new unmachined crankshaft in the chucking device.

Having thus fully set forth and described my invention what I claim as new and desire to secure by United States Letters Patent is:

1. In a center drive crankshaft chuck, a center driving ring gear, a work carrier member floatingly mounted on said ring gear, a pair of abutments fixed on said floating work carrier member for engaging the rough irregular surfaces of a crankshaft web of a crankshaft prelocated on the axis of rotation of said ring gear, a clamping block arranged to simultaneously engage said crank and said floating work carrier member and adapted to be removed from said chucking device when loading and unloading work therein, and clamping means associated with said clamping block and carried on said floating work carrier, adapted to effect firm engagement of the abutments of said work carrier and said clamping block securely on the rough irregular web of said crankshaft, and means for locking said floating work carrier member to said ring when all of said abutments have been securely engaged on said crankshaft web.

2. In a crankshaft chuck, a center drive ring gear work spindle, a semi-circular work carrier member floatingly mounted on said work spindle, abutments fixed on said floating work carrier engaging a crankshaft web to one side of the axis of rotation of said work spindle, a removable clamping block having a surface engaging the work piece and a second surface engaging said floating work carrier, a clamping arm pivotally mounted on said work carrier and having a contact point arranged to be swung down into engagement with said clamping block so as to effect simultaneous engagement of said block with said work piece and work carrier, and clamping means associated with said clamping arm for effecting the rigid binding of said work engaging surfaces of said work carrier member and said clamping block in firm engagement with the web of said crankshaft, and means for locking said floating work carrier member to said work spindle.

3. In a chuck for a machine tool work spindle, a work carrier member floatingly mounted on said work spindle, work abutment means fixed on said floating carrier member for engaging a rough prelocated work piece on said work spindle axis, a demountable work engaging abutment element simultaneously engaging said work piece and said floating member, clamping means mounted on said floating member and engaging said second work engaging abutment element, and means for locking said floating member to said work spindle.

4. In a chuck for a machine tool work spindle, a work carrier member floatingly mounted on said work spindle, work abutment means fixed on said floating carrier member for engaging a rough prelocated work piece on said work spindle axis, a pick-out work engaging abutment element simultaneously engaging said work piece and said floating member, clamping means mounted on said floating member and engaging said second work engaging abutment element, and means for locking said floating member to said work spindle.

5. In a chuck for a machine tool work spindle, a work carrier member floatingly mounted on said work spindle, work abutment means fixed on said floating carrier member for engaging a rough prelocated work piece on said work spindle axis, a demountable work engaging abutment element simultaneously engaging said work piece and said floating member, a clamping arm mounted on said floating member and engaging said second work engaging abutment element, clamping means mounted on said floating member and engaging said arm to hold said arm in engagement with said abutment element, and means for locking said floating member to said work spindle.

6. In a center drive crankshaft chucking device, a center drive ring gear work spindle, a floating work carrier member mounted on said work spindle, work engaging abutments fixed on said floating member for engaging a web of a crankshaft to one side of the axis of rotation of said work spindle, a second removable work engaging abutment element having a work engaging abutment surface engaging said crankshaft diametrically opposite to said first mentioned abutments and an abutment surface engaging said floating member, clamping means mounted on said floating work carrier and engaging and holding all of said abutments rigidly on said work piece, and means for locking said floating work carrier on said ring gear when said abutments are engaged on said work piece.

7. In a chucking device for a machine tool work spindle adapted for axial loading of a work piece therein, a rotary chuck body, a floating work engaging member carried on said chuck body, work engaging portions on said member adapted to engage a work piece presented in said chuck, a saddle-piece simultaneously engaging said floating work engaging member and said work piece and removable from said chuck to permit free access in axially loading or unloading the work piece therein, and clamping means carried by said floating work engaging member and engaging said saddle-piece to bind said work piece to said floating work engaging member.

8. In a chucking device for a machine tool work spindle adapted for axial loading of a work piece therein, a rotary chuck body, a floating work engaging member carried on said chuck body, work engaging portions on said member adapted to engage a work piece presented in said chuck, a saddle-piece simultaneously engaging said floating work engaging member and said work piece and removable from said chuck to permit free access in axially loading or unloading the work piece therein, and clamping means carried by said floating work engaging member and engaging said saddle-piece to bind said work piece to said floating work engaging member, and means for locking said floating work engaging member to said chuck body when said saddle-piece is bound on said work piece in said chuck by said clamping mechanism.

WILLIAM F. GROENE.